United States Patent
Benedetti et al.

(10) Patent No.: US 12,227,043 B2
(45) Date of Patent: Feb. 18, 2025

(54) CONNECTING DEVICE BETWEEN THE BELLOWS AND THE FRAME OF ARTICULATED VEHICLES

(71) Applicant: P.E.I. PROTEZIONI ELABORAZIONI INDUSTRIALI S.R.L., Calderara di Reno (IT)

(72) Inventors: Michele Benedetti, Bologna (IT); Luca Guidi, Bologna (IT)

(73) Assignee: P.E.I. PROTEZIONI ELABORAZIONI INDUSTRIALI S.R.L., Calderara di Reno (IT)

( * ) Notice: Subject to any disclaimer, the term of this patent is extended or adjusted under 35 U.S.C. 154(b) by 645 days.

(21) Appl. No.: 17/498,153

(22) Filed: Oct. 11, 2021

(65) Prior Publication Data
US 2022/0134822 A1 May 5, 2022

(30) Foreign Application Priority Data
Nov. 3, 2020 (IT) .......................... 202020000006142

(51) Int. Cl.
*B60D 5/00* (2006.01)
*B61D 17/22* (2006.01)

(52) U.S. Cl.
CPC ............. *B60D 5/003* (2013.01); *B61D 17/22* (2013.01)

(58) Field of Classification Search
CPC .......... B60D 5/00; B60D 5/003; B61D 17/20; B61D 17/22; B62F 47/02
USPC ....................................................... 280/403
See application file for complete search history.

(56) References Cited

U.S. PATENT DOCUMENTS 9,284,770 B2 * 3/2016 Sprague .................... E06B 9/52

FOREIGN PATENT DOCUMENTS

| CN | 206426774 U | 8/2017 | |
|---|---|---|---|
| CN | 206749810 U | 12/2017 | |
| EP | 2149463 A1 * | 2/2010 | ............. B60D 5/003 |
| EP | 3184330 A1 | 6/2017 | |

OTHER PUBLICATIONS

Turkish Searcch Report dated Dec. 27, 2022 from counterpart Turkish Patent Application No. 2021/017080.

* cited by examiner

*Primary Examiner* — Anne Marie M Boehler
*Assistant Examiner* — Felicia L. Brittman-Alabi
(74) *Attorney, Agent, or Firm* — SHUTTLEWORTH & INGERSOLL, PLC; Timothy J. Klima

(57) ABSTRACT

Described is a device for connecting between the bellows and the frame of articulated vehicles, including a connecting element having a hooking portion which can be coupled to an end edge of a bellows, and an engagement portion which can be inserted in a compartment defined by a rigid support of the frame of the vehicle and abutting at least one first inner wall of the compartment; the device also has an elastically deformable insertion element, also positioned in the compartment between the connecting element and a second inner wall, for stably engaging the engagement portion against said first inner wall. The insertion element and the connecting element comprise reciprocal coupling means configured for making a mutual connection between the insertion element and the connecting element.

18 Claims, 2 Drawing Sheets

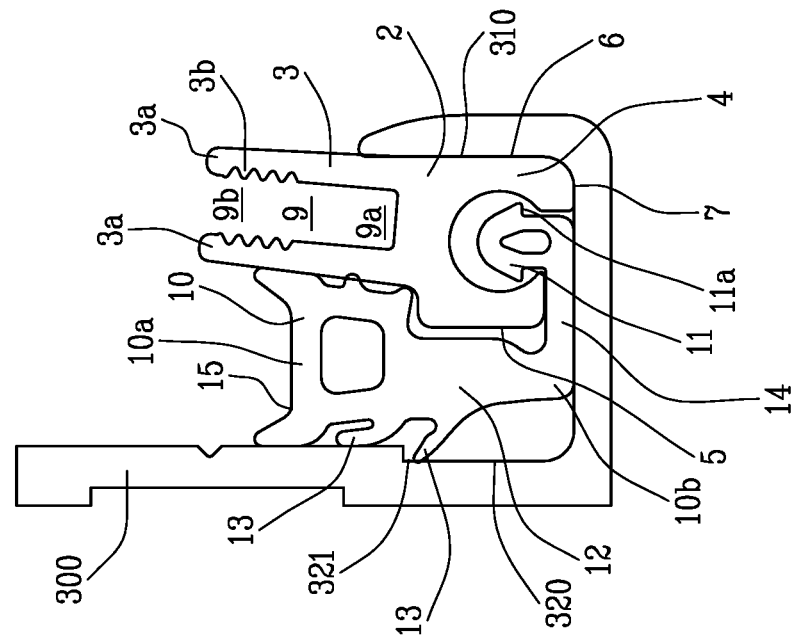
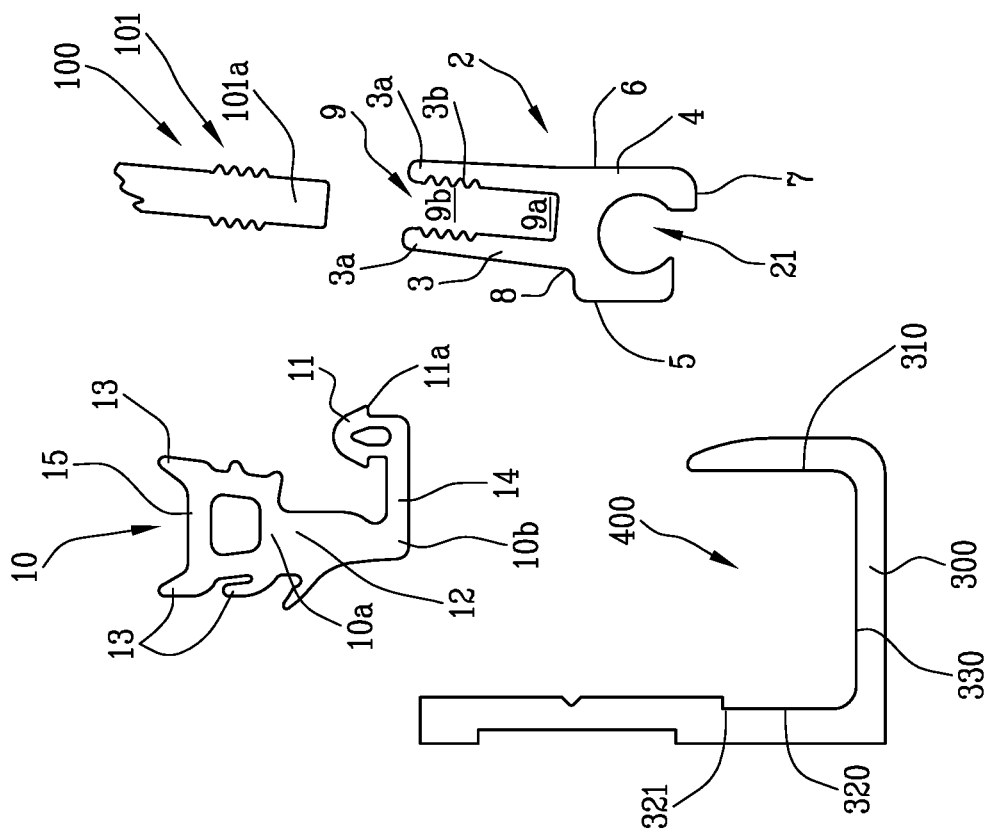

CONNECTING DEVICE BETWEEN THE BELLOWS AND THE FRAME OF ARTICULATED VEHICLES

This application claims priority to Italian Patent Application 202020000006142 filed Nov. 3, 2020, the entirety of which is incorporated by reference herein.

BACKGROUND OF THE INVENTION

This invention relates to a connecting device between the bellows and the frame of articulated vehicles, in particular for articulated vehicles such as buses and trams.

SUMMARY OF THE INVENTION

In articulated vehicles, such as, for example, buses and urban trams, the connection between the two carriages which make up the vehicle is made using rotary platforms which are able to allow both the passage and the standing of passengers in the connecting zone.

The connecting zone must inevitably guarantee safe conditions even when the vehicle goes round a bend, that is to say, even when the two carriages are not aligned with each other.

Connecting devices are known comprising a bellows substantially in the shape of an inverted U and the ends of which are connected to the free ends of the two carriages, in such a way that the bellows covers the zone of the rotatable platform and deforms when the vehicle adopts configurations wherein the two carriages are not aligned.

In particular, the bellows-type connection device is accordion-shaped, that is to say, it has a plurality of U or V-shaped bands made of flexible material, joined together longitudinally.

Usually, there is also an additional internal bellows, which extends between a side wall of the bellows and the rotatable platform in order to better protect the joint between the side wall of the bellows and the rotatable platform.

The bellows is stably fixed to the corresponding ends of the two carriages of the vehicle using specially made coupling systems. These coupling systems comprise a profile, generally metallic, rigidly associated with the frame of the motor vehicle and extending along the entire perimeter extension of the frame.

This profile defines a compartment for housing a seal made of deformable elastomeric material designed to engage an end edge of the bellows.

In more detail, as illustrated in patent document EP0499773 the end edge of the bellows is coupled by suitable connecting bands to a cable having a transversal cross-section much greater than the cross-section of the bellows. The cable is inserted in a cavity of the seal, made between respective deformable flaps. In this way, the cable remains engaged inside the cavity defining a stable coupling of the bellows with the seal.

Undercuts are also positioned for coupling between the seal and the above-mentioned housing compartment for anchoring the seal to the metal profile.

However, coupling systems of the type described above have significant drawbacks.

Firstly, the seal may lose over time its elastic properties and therefore allow the escape of the cable from the respective cavity, causing the bellows to be uncoupled from the frame.

Moreover, the loss of the elastic characteristics of the seal can cause damage to the coupling undercuts, with the consequent detachment of the seal from the above-mentioned profile.

Moreover, damage to the seal may cause the formation of openings and cracks inside of which water or other detritus may infiltrate.

Lastly, a further drawback is due to the bands for coupling the end edge with the cable, which do not guarantee a stable connection with the above-mentioned cable.

Another problem of the prior art relates to the installation of these systems.

Typically, the components of these systems are in fact assembled in situ, that is to say, during installation of the system on the vehicle.

It follows that the assembly of the devices may prove to be imprecise, resulting in malfunctioning of the system during use, since the operator does not operate in optimum conditions.

Moreover, in order to mount such systems it is necessary for the operator to physically position on the roof of the vehicle, making the installation even potentially dangerous since the operators are forced to handle and manipulate the various components at a considerable height.

In this context, the technical purpose which forms the basis of the invention is to provide a connecting device between the bellow and the frame of articulated vehicles which overcomes the above-mentioned drawbacks of the prior art.

In particular, the aim of the invention is to provide a connecting device between the bellows and the frame of articulated vehicles which is able to increase the reliability of the connection between bellows and frame.

A further aim of the invention is to provide a connecting device between the bellows and the frame of articulated vehicles which is resistant and long lasting.

A further aim of the invention is to provide a connecting device between the bellows and the frame of articulated vehicles which can be installed in an optimum, precise and safe manner by the operators.

The technical purpose indicated and the aim specified are substantially achieved by a connecting device between the bellows and the frame of articulated vehicles with the technical features described in one or more of the appended claims.

BRIEF DESCRIPTION OF THE DRAWINGS

Further features and advantages of the invention are more apparent in the non-limiting description below, with reference to a preferred, non-limiting, embodiment of a connecting device between the bellows and the frame of articulated vehicles as illustrated in the accompanying drawings, in which:

FIG. 2A is an exploded plan view of a frame-bellows joint comprising a connecting device according to the invention;

FIG. 2B is a plan view of an operating configuration of the frame-bellows joint of FIG. 2A.

DESCRIPTION OF THE PREFERRED EMBODIMENTS

Figure 1:
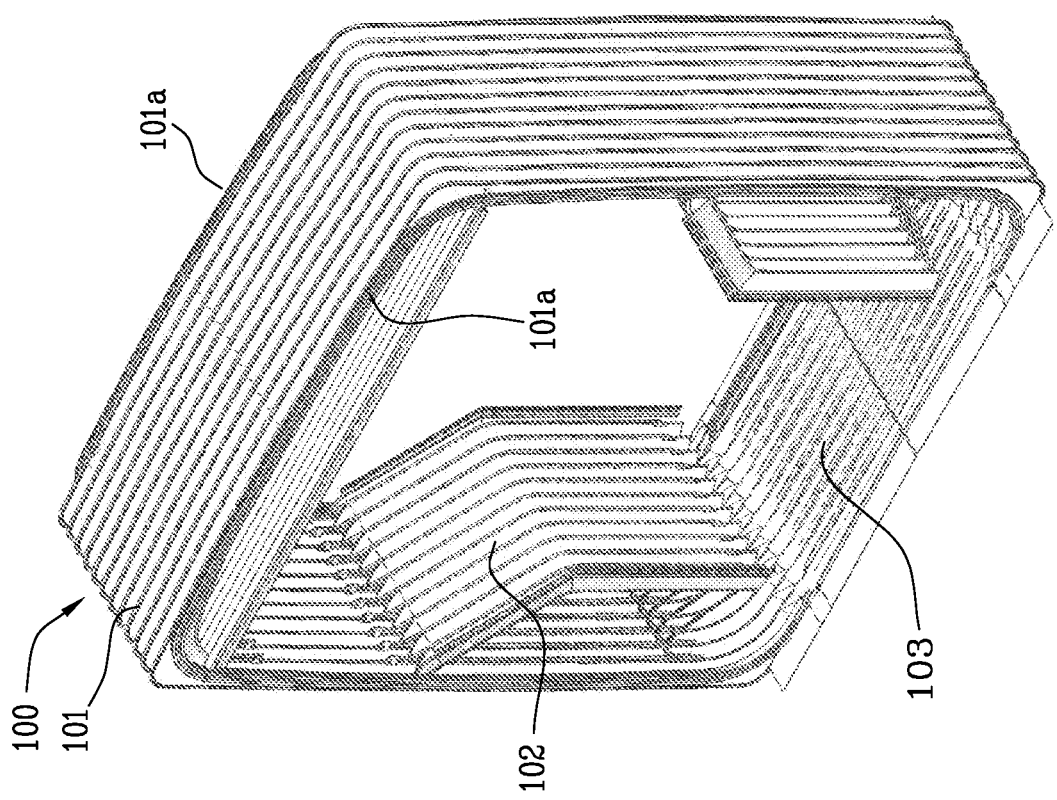
FIG. 1 is a perspective view of a bellows for articulated vehicles, and in particular for articulated buses.

With reference to the accompanying drawings, the numeral 100 denotes in its entirety a bellows for an articulated vehicle which, preferably but not exclusively, may be an articulated bus. In articulated buses, the bellows 100 is positioned in an intermediate position between the two carriages of the bus and in particular it is positioned to cover the rotatable platform for connecting the two carriages.

Looking in more detail, with reference to FIG. 1, the bellows 100 comprises an outer bellows 101 having the shape of an upturned U and a pair of inner bellows 102 positioned at vertical walls of the outer bellows 101 to cover the lower joining zones between the outer bellows 101 and a lower covering element 103 which covers the rotary platform.

Each bellows 101, 102 comprises a plurality of bands 110 made of flexible material and equipped with stiffening frames 120.

Preferably, the bands 110 are made of fabric and the stiffening frames 120 are made of aluminum or a rigid material.

The bands 110 are connected to each other to form a single tunnel-like deformable connecting element between the two carriages of the vehicle and, preferably, the bands 110 are sewn together.

The stiffening frames 120 have the twofold function of protecting the stitching between the bands 110 and stiffening the tunnel structure.

Preferably, the invention is applied to outer bellows 101 and specifically to the respective end edges 101a.

With reference to FIG. 2A, the numeral 200 denotes a portion of the frame of one of the two carriages of the vehicle, and in particular the portion 200 of the frame may comprise a front termination of the frame or an element applied to the frame.

With reference to the accompanying drawings, the above-mentioned portion 200 of the frame comprises a rigid support 300 having a main direction of extension and having a first and a second inner wall 310, 320 facing each other and connected by a respective bottom wall 330.

The rigid support 300 preferably has a prismatic shape with a square or rectangular cross-section and is internally hollow to form a compartment 400 which extends along the main direction of extension of the rigid support 300.

FIGS. 2A and 2B show a preferred embodiment, but without limiting the scope of the invention, of a connecting device 1, in accordance with the invention, for making the connection between the frame of the carriages of the articulated vehicle and the bellows 100.

The connecting device 1 comprises a connecting element 2 having a hooking portion 3 which can be coupled to the end edge 101a of the outer bellows 101, and an engagement portion 4 which can be inserted in the above-mentioned compartment 400 and abutting or which can be abutted against at least the first inner wall 310 of the compartment 400.

The connecting element 2 has a main direction of extension parallel to the main direction of extension of the compartment 400.

The connecting element 2 is made of rigid material, preferably metal, such as steel or aluminum.

Alternatively, the connecting element 2 may be made of rigid plastic material.

As shown in detail in FIGS. 2A and 2B, the above-mentioned hooking portion 3 may comprise two retaining portions 3a, opposite each other and forming a seat 9 inside of which, in use, the end edge 101a of the outer bellows 101 is housed.

The two retaining portions 3a may also comprise a toothing 3b made in the seat 9 and engaged, in use, on the outer surface of the end edge 101a.

In particular, the seat 9 may have a slot defining a bottom portion 9a with a substantially rectangular cross-section, and an upper portion 9b in which the toothing 3b is formed.

In other words, in use, the toothing 3b is anchored to the end edge 101a of the bellows 101 to prevent it from moving away from the seat 9, and in particular from the bottom portion 9a.

The seat 9 is substantially shaped to match to receive the end edge 101a of the outer bellows 101, in such a way as to define a shape coupling.

Moreover, as shown in the drawings, the above-mentioned engagement portion 4 may have a prismatic shape with a substantially rectangular or almost rectangular cross-section for being easily insertable in the compartment 400 and remaining housed inside it in a stable fashion.

In particular, the engagement portion 4 may have a first and a second contact surface, respectively labelled 5 and 6, opposite each other and a lower surface 7 abutting, in use, the above-mentioned bottom wall 330 of the compartment 400.

It should be noted that, in use, the first contact surface 5 faces the second inner wall 320 and is spaced from it, whilst the second contact surface 6 faces the first inner wall 310 and is in contact with it.

In particular, an insertion element 10 can be inserted between the second inner wall 320 and the connecting element 2.

The insertion element 10 can be inserted in the compartment 400 between the connecting element 2 and the second inner wall 320 of the compartment 400, for stably engaging the engagement portion 4 against the first inner wall 310.

The insertion element 10 is made of an elastically deformable material, preferably an elastomeric material, even more preferably rubber.

As shown in detail in FIGS. 2A and 2B, the insertion element 10 may have a substantially L-shaped transversal cross section having a first portion 10a designed to rest against the second inner wall 320 of the compartment 400 and a second portion 10b, transversal and preferably perpendicular to the first portion, designed to be positioned close to or at the bottom wall 330 of the compartment 400.

In particular, the first portion 10a of the insertion element 10 may comprise a seal 12 having a tapered cross section and equipped with a plurality of deformable protruding tabs 13 configured to engage against the second inner wall 320 of the compartment 400, opposite the first wall 310, and against the first contact surface 5 of the engagement portion 4 for pushing the second contact surface 6 of the engagement portion 4, opposite the first contact surface 5, against the first inner wall 310 of the compartment 400.

In other words, a plurality of deformable protruding tabs 13 extend from the seal 12, comprising a series of elastic and deformable segments, spaced from each other. It should be noted that, in the inserted condition of the insertion element 10, as illustrated in FIG. 2B, the deformable protruding tabs 13 are deformable against the second inner wall 320 and against the first contact surface 5 of the engagement portion 4. In this way, the deformable protruding tabs 13 apply a pushing action on the connecting element 2 keeping the latter against the first inner wall 310.

The second portion 10b of the insertion element 10 can define a base 14 having a substantially planar transversal cross-section and configured to be positioned, in use, at least partly between the bottom wall 330 of the compartment 400 and the third contact surface 7 of the connecting element 2, facing the bottom wall 330.

The first portion 10a of the insertion element 10 may also comprise a closing end 15 opposite the base 14 and abutting the second inner wall 320 and the hooking portion 3 in order to close said compartment 400 in a fluid-tight manner.

In other words, in the inserted condition of the element 10, the shape of the closing end 15 guarantees a total obstruction of the compartment 400 keeping the compartment 400 in a fluid-tight manner and preventing any infiltration of water.

At a functional level, the insertion element 10 may be configured enclose the connecting element 2 on at least two sides in such a way that the second portion 10b of the insertion element 10 defines a first limit stop for the connecting element 2 along a first direction parallel to the direction of insertion in the compartment 400 and in such a way that the first portion 10a of the insertion element 10 defines, more specifically by means of a shoulder defined preferably by a wide section and/or by a deformable protruding tab 13, a second limit stop for the connecting element 2 along a second direction parallel to the direction of insertion inside the compartment 400 and opposite the first direction, thus defining a stable locking of the connecting element 2 relative to the insertion element 10.

In particular, the first contact surface 5 of the connecting element 2 may have at least one engaging portion 8, in particular defined by a concavity or shoulder, configured to receive a protruding portion of the first portion of the insertion element 10, in particular the above-mentioned widening of the cross-section and/or a deformable protruding tab 13 of the insertion element 10 to define the above-mentioned second limit stop.

Moreover, the second inner wall 320 may have at least one undercut or shoulder 321 defining an engaging portion with a further shoulder defined preferably of the first portion 10a of the insertion element 10, in particular with a widening of the cross-section and/or a deformable protruding tab 13.

According to a particular aspect of the invention, the insertion element 10 and the connecting element 2 comprise reciprocal coupling means 11, 21 configured for making a mutual connection between the insertion element 10 and the connecting element 2.

Advantageously, the coupling means 11, 21 make the insertion element 10 and the connecting element 2 substantially integral in such a way as to limit possible reciprocal movements which would adversely affect the stability and reliability of the connection between the bellows and the frame.

It follows that the entire bellows-frame joint is very stable and reliable.

Moreover, since the reciprocal movements are limited by the coupling means 11, 21, the bellows-frame joint gains in terms of strength and durability over time as the insertion element 10 and the connecting element 2 are less subject to rubbing and mechanical stress.

Moreover, advantageously, the coupling means 11, 21 allow the connecting element 2 to be assembled with the insertion element 10 before a complete installation of the device 1, in such a way as to guarantee a precise installation of the device 1 on the vehicle.

Moreover, advantageously, the operator can install the device 1 without the need to physically climb on the roof of the vehicle.

According to a first aspect, the coupling means 11, 21 may define a shape coupling.

Advantageously, with this type of coupling, no further fixing means are necessary.

Preferably, the coupling means 11, 21 can define a mutual engagement.

For example, according to a preferred embodiment, the coupling means 11, 21 may define a snap-on coupling.

Advantageously, this feature allows the insertion element 10 and the connecting element 2 to be coupled quickly and easily.

As illustrated in FIGS. 2A and 2B which illustrate a non-limiting example embodiment of the coupling means 11, 21, they may comprise at least one protrusion 11 which can be inserted, in particular elastically, into a corresponding recess 21.

The protrusion 11 and the recess 21 may be made in such a way that the protrusion 11 has at least one undercut 11a designed to stably hold the protrusion 11 within the recess 21.

Moreover, the protrusion 11 may also have a distal portion having a tapered front surface to form a guide for insertion into the recess 21 and may have a rear surface designed to define a contrast against the withdrawal of the protrusion 11 from the recess 21.

For example, the protrusion 11 may have a cone or truncated cone or pyramid shape.

Advantageously, in that way, the insertion of the protrusion 11 into the recess 21 is substantially guided by the shape of the protrusion 11 itself.

Preferably, the protrusion 11 is made or positioned on the insertion element 10 and the recess 21 is made or positioned on the connecting element 2.

Still more preferably, the protrusion 11 is made or positioned on the second portion 10b of the insertion element 10 whilst the recess 21 is made or positioned in the proximity of the third contact surface 7 of the connecting element 2.

Functionally, the mutual connection defined by the coupling means 11, 21, preferably occurs along a direction substantially parallel to a direction of insertion of the device 1 inside said compartment 400 defined by the rigid support 300 of the frame of the vehicle.

Advantageously, in this way, the pushing action applied by the deformable protruding tabs 13 against the connecting element 2, which has at least one component transversal to the direction of insertion of the device 1 inside the compartment 400, is combined with the action of the coupling means 11, 21 which has a component parallel and opposite to the direction of insertion of the device 1 in the compartment 400.

The invention achieves the preset aims, overcoming the drawbacks of the prior art.

In fact, one aim achieved is to provide a connecting device 1 between the bellows and the frame of articulated vehicles which is able to increase the reliability of the connection between bellows and frame.

This result is achieved thanks to the shape of the connecting element 2, made of rigid material, and in particular by the presence of the insertion element 10 which guarantees a stable constraint of the bellows 101 to the rigid support 300.

Moreover, this result is achieved thanks to the possibility of stably coupling the connecting element 2 to the insertion element 10 using the coupling means 11, 21 making them substantially integral and limiting possible reciprocal movements during the assembly process which would adversely affect the stability and reliability of the connection between bellows and frame.

A further aim achieved is to provide a connecting device 1 between the bellows and the frame of articulated vehicles which is able to be resistant and long lasting.

This result is achieved thanks to the presence of the coupling means 11, 21 which, limiting the reciprocal movements between the insertion element 10 and the connecting element 2, make the entire bellows-frame joint much more resistant to wear and fatigue.

A further aim achieved is to provide a connecting device 1 between the bellows and the frame of articulated vehicles which can be installed in a safe and precise manner.

This result is achieved by the possibility of assembling together the insertion element 10 and the connecting element 2 in a step prior to installation of the device 1 on the vehicle in such a way as to work in optimum and safe conditions.

What is claimed is:

1. A device for connecting between a bellows and a frame of articulated vehicles, comprising:
    a connecting element having a hooking portion coupled to an end edge of the bellows, and an engagement portion inserted in a compartment defined by a rigid support of the frame and which abuts against at least one first inner wall of said compartment,
    an elastically deformable insertion element inserted in said compartment between the connecting element and a second inner wall of the compartment, for stably engaging the engagement portion against the first inner wall;
    wherein said insertion element and said connecting element comprise a reciprocal coupling device configured for making a mutual connection between the insertion element and the connecting element;
    wherein said coupling device comprise a protrusion inserted into a corresponding recess;
    wherein said protrusion is made or positioned on the insertion element and the recess is made or positioned on the connecting element;
    wherein the recess is open towards a bottom; and
    wherein a portion of the protrusion, oriented in use from the bottom to a top, is completely inserted in the recess.

2. The device according to claim 1, wherein said coupling device forms a shape coupling.

3. The device according to claim 1, wherein said coupling device forms a mutual coupling.

4. The device according to claim 1, wherein said coupling device defines a snap-on attachment.

5. The device according to claim 1, wherein said protrusion and said recess are configured such that said protrusion has at least one undercut configured to stably hold the protrusion within the recess.

6. The device according to claim 1, wherein the protrusion has a distal portion having a tapered front surface to define a guide for insertion into the recess and also has a rear surface configured to define a contrast against withdrawal of the protrusion from the recess.

7. The device according to claim 1, wherein said protrusion has a cone or truncated cone or pyramid shape.

8. The device according to claim 1, wherein the mutual connection defined by the coupling device occurs along a direction substantially parallel to a direction of insertion of the device inside said compartment defined by the rigid support of the frame.

9. The device according to claim 1, wherein the insertion element has a substantially L-shaped transversal cross-section having a first portion configured to rest against said second inner wall of the compartment and a second portion, transversal to the first, configured to be positioned close to or at a bottom wall of the compartment, positioned for connection between said first and second inner walls, and wherein said protrusion is at least partly positioned on said second portion.

10. The device according to claim 9, wherein the second portion of the insertion element defines a base having a substantially planar transversal cross-section shape and configured to be positioned, in use, at least partly between said bottom wall of the compartment, and a third contact surface of said connecting element, facing said bottom wall.

11. The device according to claim 9, wherein the insertion element is configured to enclose the connecting element on at least two sides such that said second portion of the insertion element defines a first limit stop for the connecting element along a first direction parallel to a direction of insertion in the compartment and such that said first portion of the insertion element defines, by a shoulder defined by a wide section and/or by a deformable protruding tab, a second limit stop for the connecting element along a second direction parallel to the direction of insertion inside the compartment and opposite the first direction, thus defining a stable locking of the connecting element relative to the insertion element.

12. The device according to claim 11, wherein said first contact surface of the connecting element has at least one engaging portion, defined by a concavity or shoulder, configured to receive a protruding portion of the first portion of the insertion element, said widening of the cross-section and/or a deformable protruding tab of the insertion element defining said second limit stop.

13. The device according to claim 11, wherein the second inner wall has at least one undercut or shoulder defining an engaging portion with a protruding portion of the first portion of the insertion element, with a widening of the cross-section and/or a deformable protruding tab.

14. The device according to claim 9, wherein said first portion of the insertion element comprises a closing end opposite said base and abutting said second inner wall and said hooking portion for closing said compartment in a fluid-tight manner.

15. The device according to claim 9, wherein the first portion of the insertion element comprises a seal having in transversal cross-section a tapered shape and including a plurality of deformable protruding tabs configured to engage against the second inner wall of the compartment opposite to said first wall, and against a first contact surface of the engagement portion for pushing a second contact surface of the engagement portion, opposite the first, against said first wall of the compartment.

16. The device according to claim 1, wherein said hooking portion comprises two retaining portions, opposite to each other and forming a seat inside of which, in use, said end edge is housed; said two retaining portions comprising a toothing made in said seat and engaged, in use, on an outer surface of said end edge.

17. The device according to claim 16, wherein said seat has a slot defining a bottom portion with a substantially rectangular cross-section, and an upper portion on which said toothing is formed.

18. The device according to claim 1, wherein said mutual connection between the insertion element and the connecting element is removable.

* * * * *